(12) United States Patent
Sakaguchi et al.

(10) Patent No.: US 10,797,419 B2
(45) Date of Patent: Oct. 6, 2020

(54) EXTERNALLY-ATTACHED PTC ELEMENT AND TUBULAR BATTERY

(71) Applicant: FDK CORPORATION, Tokyo (JP)

(72) Inventors: Makoto Sakaguchi, Tokyo (JP); Nozomi Asano, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 15/537,978

(22) PCT Filed: Nov. 20, 2015

(86) PCT No.: PCT/JP2015/082796
§ 371 (c)(1),
(2) Date: Jun. 20, 2017

(87) PCT Pub. No.: WO2016/104009
PCT Pub. Date: Jun. 30, 2016

(65) Prior Publication Data
US 2018/0166817 A1 Jun. 14, 2018

(30) Foreign Application Priority Data
Dec. 26, 2014 (JP) .................................. 2014-263897

(51) Int. Cl.
*H01R 13/03* (2006.01)
*H01C 7/02* (2006.01)
(Continued)

(52) U.S. Cl.
CPC ............... *H01R 13/03* (2013.01); *H01C 7/02* (2013.01); *H01M 2/30* (2013.01); *H01M 2/34* (2013.01);
(Continued)

(58) Field of Classification Search
CPC ........ H01M 2/30; H01M 2/348; H01M 8/004; H01M 10/425; H01M 2200/106; H01C 7/02
See application file for complete search history.

(56) References Cited

U.S. PATENT DOCUMENTS

| | | | | |
|---|---|---|---|---|
| 6,356,051 | B1* | 3/2002 | Hasunuma | H01M 2/105 320/107 |
| 2004/0126651 | A1* | 7/2004 | Kim | H01M 2/0257 429/61 |

(Continued)

FOREIGN PATENT DOCUMENTS

| CN | 201725828 U | * | 1/2011 |
|---|---|---|---|
| CN | 102064304 A | | 5/2011 |

(Continued)

OTHER PUBLICATIONS

Derwent Abstract for Song et al., CN 201725828 U. (Year: 2019).*
(Continued)

*Primary Examiner* — Robert S Carrico
(74) *Attorney, Agent, or Firm* — Greer Burns & Crain Ltd.

(57) ABSTRACT

An externally-attached PTC element attachable to one electrode terminal of a tubular battery with electrode terminals on both end surfaces, the externally-attached PTC element including: a bottom plate made of a metal plate; a plate-shaped PTC element; and a top panel made of a metal plate, the plate-shaped PTC element and the top panel being stacked in that order above the bottom plate disposed below, the PTC element being disposed in an opposed area between the top panel and the bottom plate, the top panel projecting and extending in one direction with respect to a planar area of the bottom plate, the top panel having a distal end formed into a lead terminal shape mountable to a circuit board.

3 Claims, 8 Drawing Sheets

(51) Int. Cl.
*H01M 2/30* (2006.01)
*H01M 2/34* (2006.01)
*H01M 10/42* (2006.01)
*H01M 8/00* (2016.01)

(52) U.S. Cl.
CPC .......... *H01M 2/348* (2013.01); *H01M 8/004* (2013.01); *H01M 10/425* (2013.01); *H01M 2200/106* (2013.01)

(56) References Cited

U.S. PATENT DOCUMENTS

| | | | | |
|---|---|---|---|---|
| 2011/0117400 | A1* | 5/2011 | Chun | H01M 2/34 429/62 |
| 2012/0052331 | A1* | 3/2012 | Park | H01M 2/202 429/7 |
| 2012/0121937 | A1* | 5/2012 | Kwak | H01M 2/34 429/7 |
| 2013/0234721 | A1* | 9/2013 | Nakamura | H01M 2/105 324/434 |

FOREIGN PATENT DOCUMENTS

| | | |
|---|---|---|
| EP | 1026758 A1 | 8/2000 |
| JP | 2-69440 | 5/1990 |
| JP | 02069440 A | 5/1990 |
| JP | 04148501 A | 5/1992 |
| JP | 06038157 A | 5/1994 |
| JP | 06038157 U | 5/1994 |
| JP | 2002-150918 A | 5/2002 |
| JP | 2005158582 A | 6/2005 |
| JP | 2013-101794 A | 5/2013 |

OTHER PUBLICATIONS

Extended EP Search Report issued in corresponding EP App. No. 15 872 578.8, dated Apr. 27, 2018.
Int'l. Search Report & Written opinion (with translation) issued in Int'l. App. No. PCT/JP2015/082796, dated Jan. 26, 2016.
Tyco Electronics Japan G.K., "Overview of Polyswitch and Selection Method," "Reliability of Polyswitch," [online], [searched on Dec. 18, 2014] Internet URL: http://www.te.com/japan/bu/circuitprotection/polyswitch/pdf/2011_fundamentals.pdf.
Office action issued in corresponding European Patent App. No. 15 872 578.8, dated Feb. 15, 2019.
Office action issued in corresponding Chinese Patent App. No. 201580067358.9, dated Feb. 19, 2019 (with translation).
Office action issued in corresponding Japanese Patent App. No. 2014-263897, dated Jun. 29, 2018.
Office action issued in corresponding Chinese Patent App. No. 201580067358.9.

\* cited by examiner

EXTERNALLY-ATTACHED PTC ELEMENT AND TUBULAR BATTERY

This is a National Phase Application filed under 35 U.S.C. § 371, of International Application No. PCT/JP2015/082796, filed Nov. 20, 2015.

TECHNICAL FIELD

The present invention relates to an externally-attached PTC element externally attached to a battery. The present invention also relates to a tubular battery to which the externally-attached PTC element is attached.

BACKGROUND ART

In an electronic device whose battery cannot be exchanged by a user, the battery itself is implemented on a circuit board of the electronic device as one electronic component. An electronic device handling a large current requires a safety device to cut off the current in the case of increase in temperature of the battery due to, for example, short-circuit at the inside and outside of the battery. In view of this, some batteries capable of large current discharge such as a lithium battery incorporate a Positive Temperature Coefficient (FTC) element. As is well-known, while usually having a low resistance, the PTC element is a chip component that has a laminated structure with metal foils on both surfaces of plate-shaped high-polymer material (polymer) and ceramic material (hereinafter also referred to as a PTC material) whose electrical resistance increase as the temperature increases. The PTC element, which is incorporated in the battery, is disposed in a sealing body doubling as an electrode terminal of one side of the battery.

However, some batteries include a sealing structure into which the PTC element cannot be built. Alternatively, there may be a case where current cut-off characteristics of the PTC element incorporated in the battery does not match characteristics required for the electronic device. Accordingly, as an electronic component to handle such case, a PTC element externally attached to the electrode terminal of the battery (hereinafter also referred to as an externally-attached PTC element) is available. The battery with the externally-attached PTC element attached is incorporated in the electronic device.

FIG. 1 illustrates a conventional externally-attached PTC element 101 attached to a cylindrical battery 110. FIG. 1 hatches members constituting the externally-attached PTC element 101 differently. As illustrated in FIG. 1, the externally-attached PTC element 101 has a structure of laminating metal plates (120, 130) on respective front and back of a PTC element 10 as a plate-shaped chip component and is attached to an electrode terminal 111 on one end surface of the cylindrical battery 110.

For example, fixedly securing the one metal plate 130, which constitutes the externally-attached PTC element 101, to the electrode terminal 111 on the one side of the cylindrical battery 110 by spot welding or a similar method attaches the externally-attached PTC element 101 to the cylindrical battery 110. To implement the cylindrical battery 110 with the externally-attached PTC element 101 attached on, for example, the circuit board, a lead wire 50 is connected to the other metal plate 120 of the externally-attached PTC element 101 using, for example, a solder 40.

A terminal plate 160 made of, for example, only a metal plate is attached to an electrode terminal 112, which is on the other end surface of the cylindrical battery 110. Obviously, the lead wire 50 is soldered to the terminal plate 160. Soldering the lead wire 50 to the circuit board implements the cylindrical battery 110 on the circuit board.

In addition to the externally-attached PTC element 101 illustrated as the example in FIG. 1, as illustrated in FIG. 2A and FIG. 2B as examples, there is provided an externally-attached PTC element 201 that sandwiches the PTC element 10 by two strip-shaped metal plates (220, 230).

FIG. 2A is a drawing illustrating a stacked structure of this externally-attached PTC element 201. FIG. 2B is a drawing illustrating the cylindrical battery 110 with the externally-attached PTC element 201 attached. The externally-attached PTC element 201 illustrated as the example in FIG. 2A is formed of the two electrode plates (220, 230), which are both made of the strip-shaped metal plate, opposed via the PTC element 10. While base end sides (222, 232) of both electrode plates (220, 230) are opposed to one another, distal end sides (221, 231) of the respective electrode plates (220, 230) extend so as to face directions opposite to one another. The PTC element 10 is disposed in an opposed area where both electrode plates (220, 230) are stacked to one another.

Mounting the externally-attached FTC element 201 illustrated in FIG. 2A to the cylindrical battery 110 brings the distal end side 231 of the one metal plate 230 in contact with the electrode terminal 111. Since the two strip-shaped metal plates (220, 230) extend in the identical direction through the opposed area, the externally-attached PTC element 201 significantly projects to the outside of the cylindrical battery 110. Implementing the cylindrical battery 110 in this state on the circuit board significantly separates the cylindrical battery 110 itself from the circuit board, thereby inhibiting downsizing of the electronic device.

As illustrated in FIG. 2B, the metal plate 230 on the side in contact with the electrode terminal 111 is bent along the outer shape of the cylindrical battery 110 in the middle of the extension in some cases such that the opposed area of the two electrode plates (220, 230) becomes parallel to the side surface of the cylindrical battery 110.

The following Patent Literature 1 describes an externally-attached PTC element with a structure of sandwiching a plate-shaped PTC element by two strip-shaped metal plates. The following non-Patent Literature 1 describes a structure, properties, or a similar feature of a PTC element referred to as so-called "PolySwitch" using a polymer as the PTC material.

CITATION LIST

Patent Literature

Patent Literature 1: Japanese Unexamined Patent Application Publication No. 2002-150918

Non-Patent Literature

Non-Patent Literature 1: Tyco Electronics Japan G.K., "OVERVIEW OF POLYSWITCH AND SELECTION METHOD," "RELIABILITY OF POLYSWITCH," [online], [searched on Dec. 18, 2014], Internet URL:http://www.te.com/japan/bu/circuitprotection/polyswitch/pdf/2011_fundamentals.pdf

SUMMARY OF INVENTION

Technical Problem

As described above, to implement the tubular battery with the externally-attached PTC element attached on a board or a similar component, the lead wire was installed to the externally-attached PTC element. This requires a component cost for the lead wire itself, a production cost required for a process to attach one end of the lead wire to the externally-attached PTC element, a production cost required for a process to solder the other end of the lead wire to the circuit board, or a similar cost. This makes providing a low-price electronic device into which the battery is incorporated difficult. Additionally, the lead wire needs to be wound around, thereby inhibiting the downsizing of the electronic device.

In the externally-attached PTC element with the structure of sandwiching the PTC element by the two strip-shaped electrode plates, the one electrode plate is bent. A battery can of the tubular battery doubles as a current collector of one electrode of the positive and the negative electrodes. Thus, damaging an insulating film on an outer circumference of the battery can when, for example, the strip-shaped electrode plate is bent possibly resulting in an electrical contact between the electrode plate that does not directly contact the electrode terminal and the battery can.

If the electrode terminal on which the externally-attached PTC element is attached has a pole identical to the battery can, the two electrode plates electrically contact with one another directly and the PTC element does not function. The case of different poles leads to short-circuit of the battery.

An object of the present invention is to provide an externally-attached PTC element that does not involve a cost increase, allows easily and reliably implementing a tubular battery on a circuit board, and allows saving a space required for the implementation; and a tubular battery to which the externally-attached PTC element is attached.

Solution to Problem

An aspect of the invention to achieve the above advantage is, an externally-attached PTC element attachable to one electrode terminal of a tubular battery with electrode terminals on both end surfaces, the externally-attached PTC element including: a bottom plate made of a metal plate; a plate-shaped PTC element; and a top panel made of a metal plate, the plate-shaped PTC element and the top panel being stacked in that order above the bottom plate disposed below, the PTC element being disposed in an opposed area between the top panel and the bottom plate, the top panel projecting and extending in one direction with respect to a planar area of the bottom plate, the top panel having a distal end formed into a lead terminal shape mountable to a circuit board.

Further, this invention may also provide the externally-attached PTC element in which the bottom plate has a lower surface with a shape along a planar shape of one end surface of the tubular battery, and an area on a top surface of the bottom plate other than the opposed area to the top panel is exposed as an area to be welded to the one end surface.

Moreover, this invention may also provide the externally-attached PTC element in which the tubular battery has a cylindrical shape, the tubular battery includes a base-shaped convex portion on the one end surface, the base-shaped convex portion being formed concentrically with an outer circumferential circle of the end surface, and the bottom plate includes a concave portion on the lower surface, the base-shaped convex portion being inserted into the concave portion.

A scope of this invention also includes a tubular battery to which the externally-attached PTC element according to any one of the above-described externally-attached PTC elements is attached. The tubular battery has both end surfaces serving as electrode terminals, the lower surface of the bottom plate is in contact with and attached to one end surface, and a lead terminal made of a metal plate is attached to another end surface.

Advantageous Effects of Invention

An externally-attached PTC element of the present invention does not involve a cost increase and allows easily and reliably implementing a tubular battery on a circuit board. The tubular battery with this external PTC element attached has a small implementation area, contributing to downsizing of an electronic device that has this tubular battery built-in. Other effects will be apparent in the following description.

DESCRIPTION OF EMBODIMENTS

Cross-Reference to Related Applications

Figure 1:
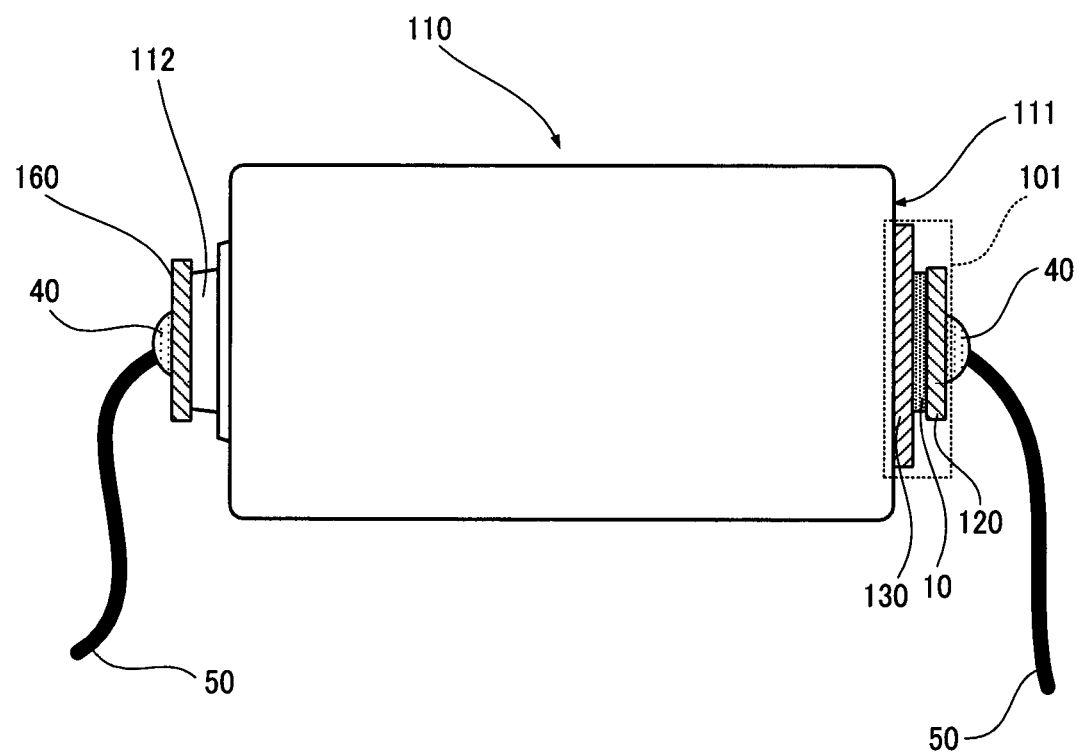
FIG. 1 is a drawing illustrating an example of a conventional externally-attached PTC element.
Figure 2A:
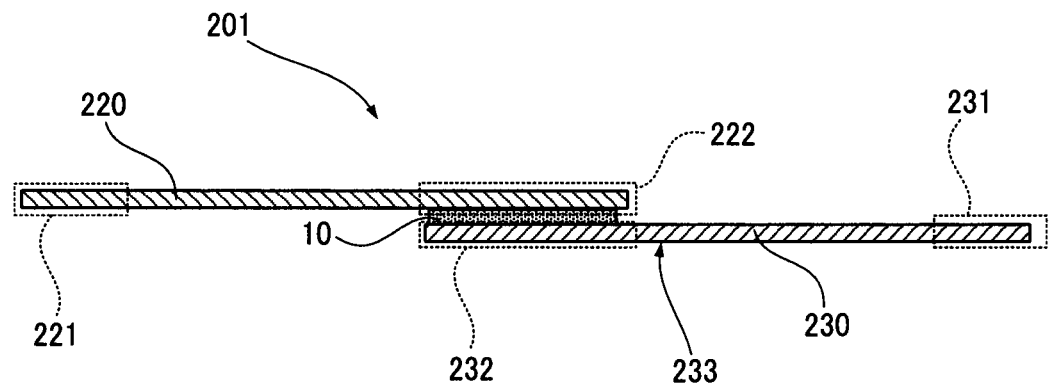
FIG. 2A is a drawing illustrating another example of a conventional externally-attached PTC element.
Figure 2B:
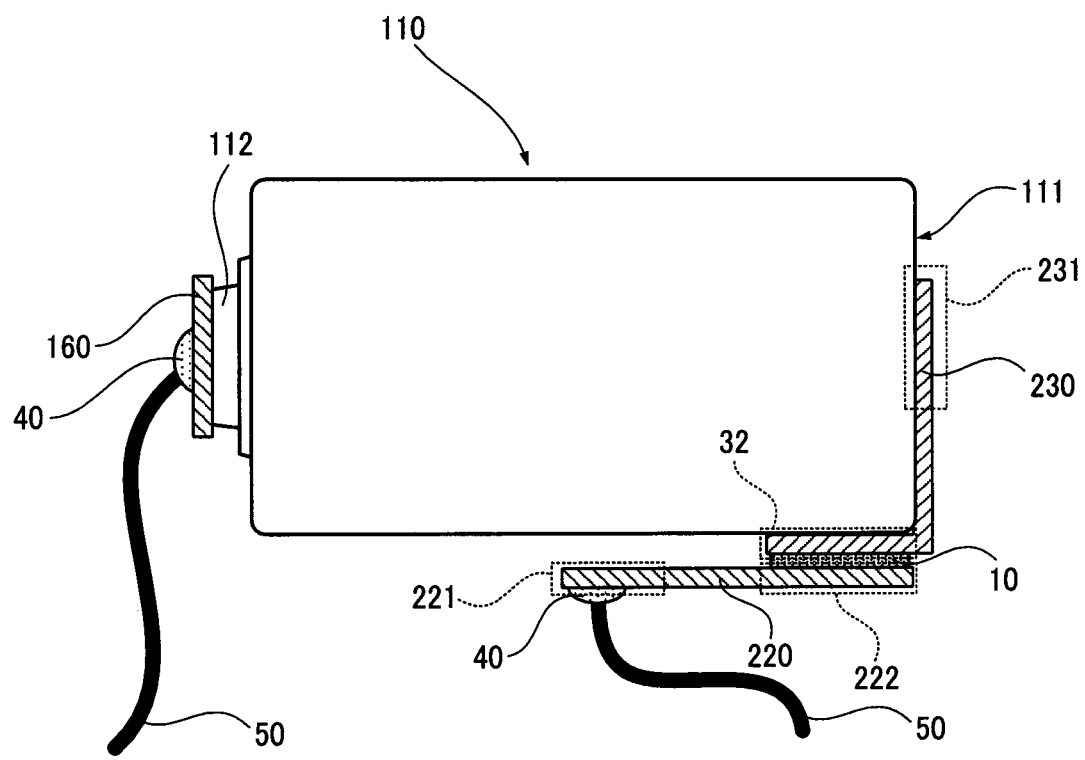
FIG. 2B is a drawing illustrating the other example of the conventional externally-attached PTC element.

This application claims priority upon Japanese Patent Application No. 2014-263897 filed on Dec. 26, 2014, which is herein incorporated by reference.

The following describes embodiments of the present invention with reference to the attached drawings. Like reference numerals designate corresponding or identical elements in the drawings used for the following description, and therefore such elements may not be further elaborated. While a reference numeral is assigned to a part in a drawing, if unnecessary, the reference numeral may not be assigned to the corresponding part in another drawing.

Embodiments

The embodiment of the present invention is an externally-attached PTC element that is to be attached to a tubular battery having both end surfaces as electrode terminals, for example, a cylindrical battery.

Figure 3A:
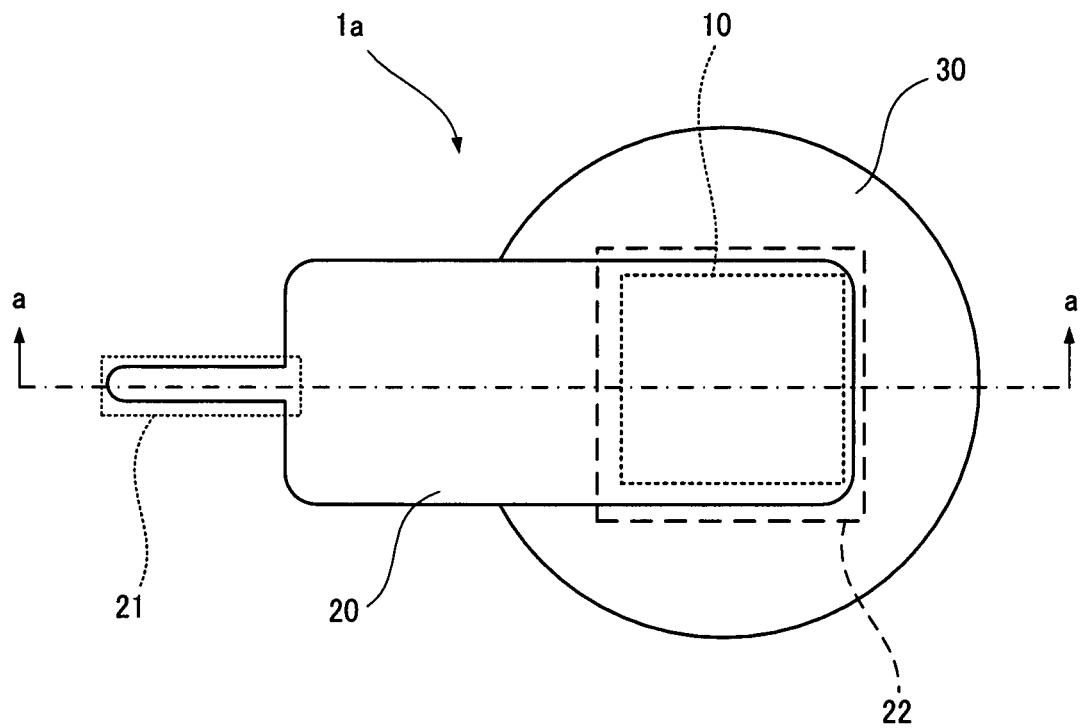
FIG. 3A is a drawing illustrating an externally-attached PTC element according to an embodiment of the present invention.
Figure 3B:
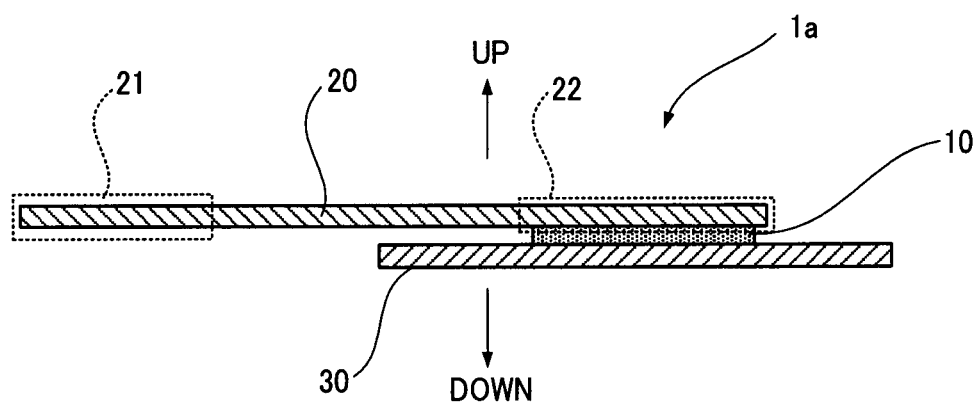
FIG. 3B is a drawing illustrating the externally-attached PTC element according to the embodiment of the present invention.

FIG. 3A and FIG. 3B are drawings illustrating a structure of an externally-attached PTC element 1a according to the embodiment. FIG. 3A is a plan view when the PTC element 1a is viewed from upward. FIG. 3B is a cross-sectional view taken along an arrow a-a in FIG. 3A.

The externally-attached PTC element 1a according to the embodiment, similar to the conventional externally-attached PTC elements (101, 102), has a basic structure of sandwiching a PTC element 10 with two metal plates (20, 30). However, the externally-attached PTC element 1a differs from the conventional externally-attached PTC elements (101, 102) in a planar shape of the metal plate (20, 30).

The following designates the metal plate 30 in contact with an electrode terminal 111 of a cylindrical battery 110 between the two metal plates (20, 30) sandwiching the PTC element 10 as the "bottom plate 30." The metal plate 20 opposed to the bottom plate 30 via the PTC element 10 is also referred to as the "top panel 20." Respective directions, upper and lower directions in the externally-attached PTC element 1a, are defined assuming that the bottom plate 30 is disposed below while the PTC element 10 and the top panel 20 are stacked in this order above the bottom plate 30.

As illustrated in FIG. 3A and FIG. 3B, in the externally-attached PTC element 1a according to the embodiment (hereinafter also referred to as the external PTC element 1a), a distal end side 21 of the top panel 20 is processed into a shape directly mountable on a circuit board. In this example, the distal end side 21 of the top panel 20 has a lead pin shape inserted into a through-hole.

As illustrated in FIG. 3B, the external PTC element 1a has a structure of sandwiching the PTC element 10 as the chip component (hereinafter also referred to as the PTC chip 10) between a base end side 22 of the top panel 20 and the bottom plate 30.

The external PTC element 1a illustrated here includes the top panel 20 and the bottom plate 30 both formed of a nickel plate having a thickness of 0.3 mm. The PTC element 10 is a so-called "PolySwitch" where a conductive polymer with a property of increasing an electrical resistance at high temperature is sandwiched with metal foils such as aluminum foils and has a thickness of 0.22 mm. The metal foil of the top panel 20 and the PTC element 10 and the metal foil of the bottom plate 30 and the PTC element 10 are bonded by a method such as a reflow soldering.

The external PTC element 1a illustrated here is configured to be attached to the flat plate-shaped electrode terminal 111 in the cylindrical battery 110. That is, insofar as a general battery is used, the external PTC element 1a is attached to the electrode terminal corresponding to the negative electrode terminal (for convenience, hereinafter also referred to as an electrode terminal surface). Obviously, some industrial batteries incorporated in the electronic device and therefore cannot be exchanged by a user include terminals of both positive electrode and negative electrode having flat electrode terminal surfaces. In any cases, the bottom plate 30 has a disk shape along the planar shape of the electrode terminal 111 (electrode terminal surface). Viewing the external PTC element 1a from upward with the bottom plate 30 side as the lower side, the bottom plate 30 is not hid by the top panel 20 and an outer circumference side of the circular plate-shaped bottom plate 30 is exposed.

Figure 4:
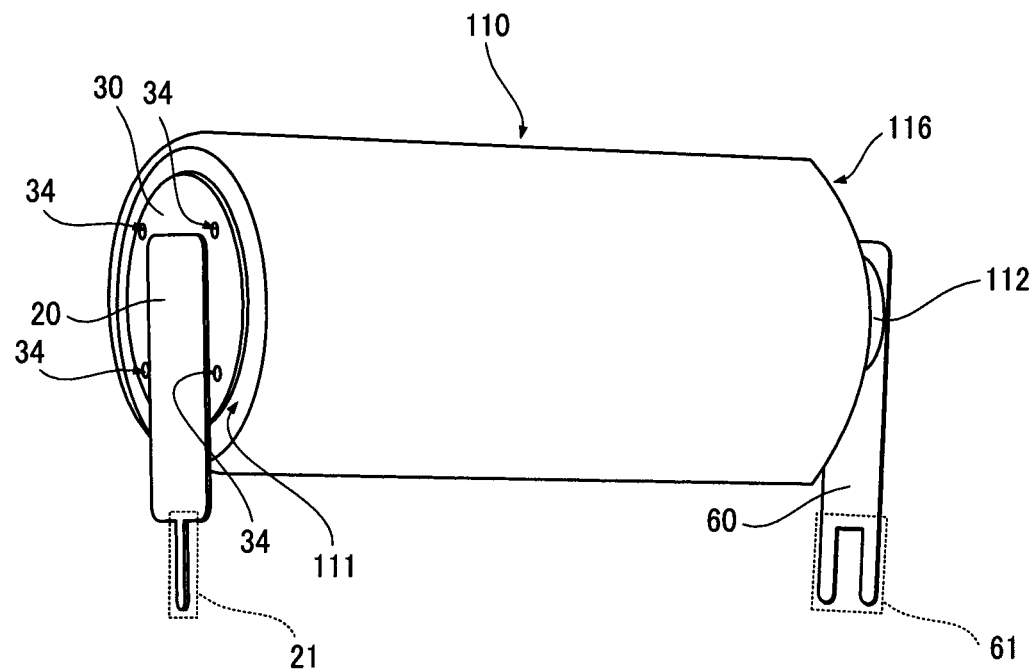
FIG. 4 is a drawing illustrating a cylindrical battery to which the externally-attached PTC element according to the embodiment is attached.

FIG. 4 illustrates the external PTC element 1a attached to the cylindrical battery 110. In this example, the bottom plate 30 of the external PTC element 1a is attached to the electrode terminal 111 of the lithium primary battery 110 with outer dimensions of diameter $\varphi=17$ mm and a length $L=33.5$ mm. As illustrated in FIG. 4, the bottom plate 30 is welded and attached to the electrode terminal 111 at predetermined positions 34 in an outer circumference area of the circular plate.

Here, the bottom plate 30 is attached to the electrode terminal 111 by spot welding. Obviously, another welding method such as a laser welding may be employed. Only a lead terminal plate 60 is attached to an electrode terminal 112, which is on an end surface 116 opposite to the electrode terminal 111, by a method such as the spot welding. In this example, to correctly implement the cylindrical battery 110 (hereinafter also referred to as the battery 110) on the circuit board, one lead pin is formed on the distal end side 21 of the top panel 20. Two lead pins are formed on a distal end side 61 of the lead terminal plate 60 on the electrode terminal 112 side. Inserting and soldering these lead pins into through-holes on the circuit board implements the cylindrical battery 110 on the circuit board.

Accordingly, similar to various electronic components with lead pin, the cylindrical battery 110 is implemented occupying the minimum necessary area on the circuit board while short-circuit or a similar failure is reliably prevented and the implementation space is not overwhelmed. That is, this ensures further downsizing the electronic device incorporating the cylindrical battery 110. Obviously, similar to other implemented components, the implementation by reflow soldering is also possible, contributing to a cost reduction of electronic devices.

Figure 5:
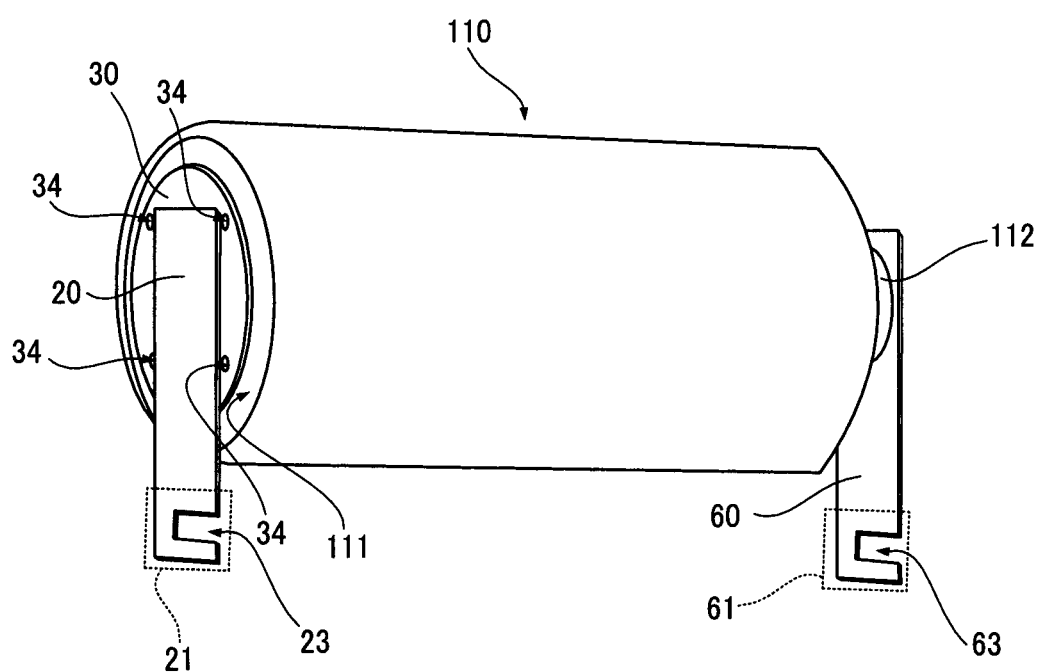
FIG. 5 is a drawing illustrating the externally-attached PTC element according to the embodiment having another terminal shape.

The terminal shape of the distal end side 21 of the top panel 20 and the distal end side 61 of the lead terminal plate 60 is not limited to the above-described lead pin shape. For example, as illustrated in FIG. 5, cutouts (23, 63) into which edges of the circuit board are inserted may be formed.

Modifications

The external PTC element 1a according to the above-mentioned embodiment is assumed to be attached to the electrode terminal 111 side having the flat surface in the cylindrical battery 110. However, for example, to secure the strength, although not as high as a positive electrode terminal in the general battery, a low-base-shaped convex portion whose surface is not a perfect flat surface but a concentric shape is formed on the electrode terminal 111 in some cases.

Figure 6A:
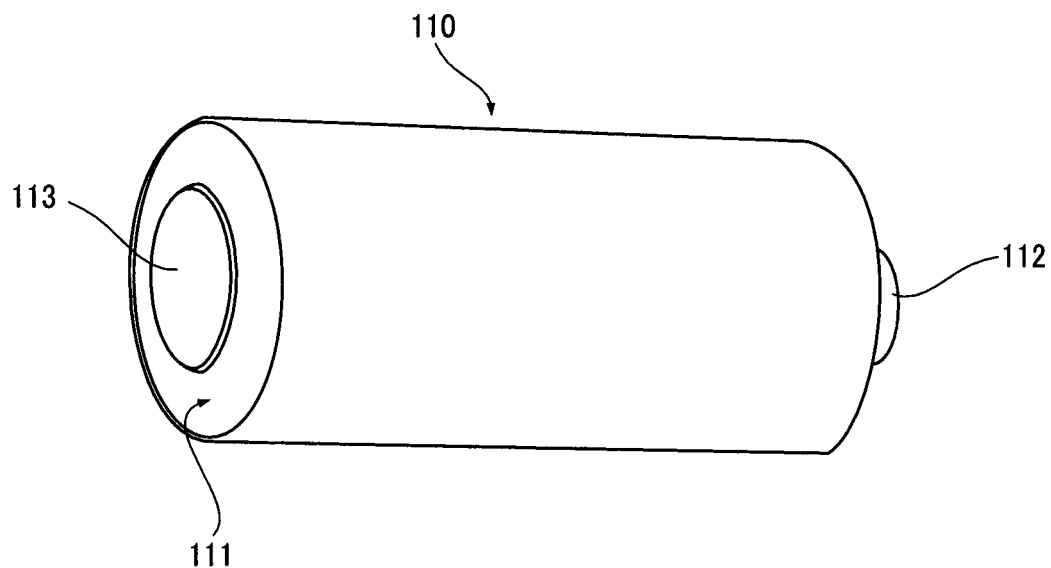
FIG. 6A is a drawing illustrating a cylindrical battery to which an externally-attached PTC element according to a modification of the embodiment is attached.
Figure 6B:
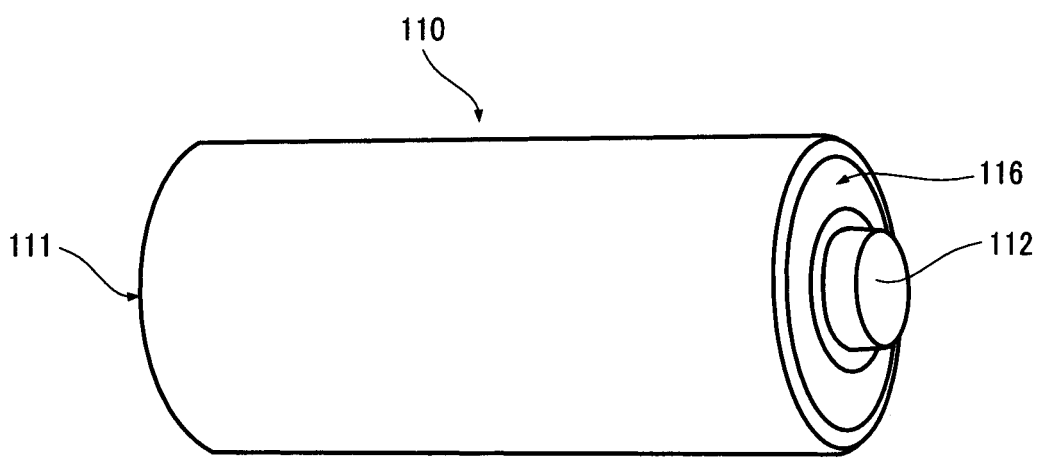
FIG. 6B is a drawing illustrating the cylindrical battery to which the externally-attached PTC element according to the modification of the embodiment is attached.

FIG. 6A and FIG. 6B illustrate the cylindrical battery 110 formed on the electrode terminal 111 with a convex portion 113 (hereinafter also referred to as a circular convex portion 113 or a base-shaped convex portion 113) lower than the electrode terminal 112.

FIG. 6A is a perspective view viewing the cylindrical battery 110 from the electrode terminal 111 side. FIG. 6B is a perspective view viewing the cylindrical battery 110 from the electrode terminal 112 side. The cylindrical battery 110 illustrated in FIG. 6A and FIG. 6B includes the circular convex portion 113 forming a concentric circle with an outer circumferential circle of the circular end surface of the cylindrical battery 110 on the electrode terminal 111. Meanwhile, the cylindrical battery 110 illustrated in FIG. 6A and FIG. 6B includes the electrode terminal 112 (hereinafter also referred to as the convex terminal 112) configured to be a column-shaped projection higher than the circular convex portion 113 on the other end surface 116.

As a modification of the externally-attached PTC element 1a according to the above-mentioned embodiment, an external PTC element 1b attachable also to the electrode terminal 111 with the circular convex portion 113.

Figure 7A:
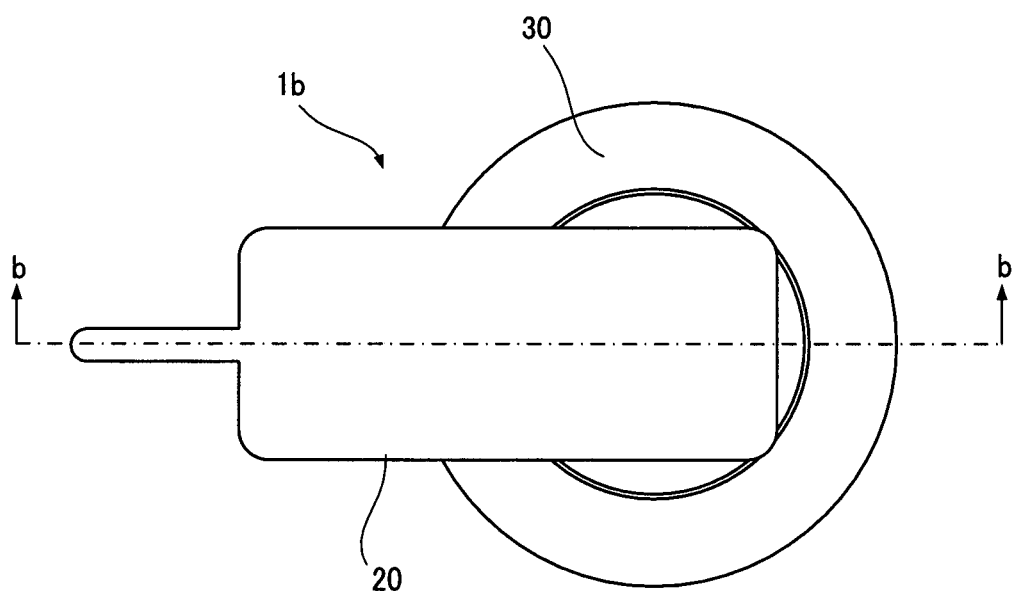
FIG. 7A is a drawing illustrating an externally-attached PTC element according to a modification.
Figure 7B:
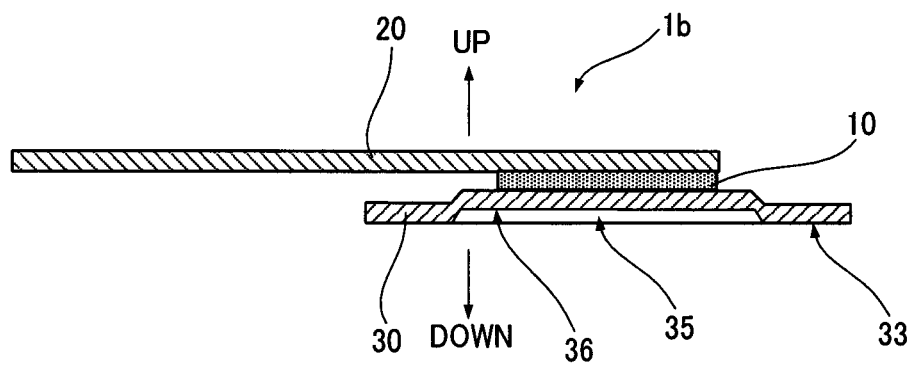
FIG. 7B is a drawing illustrating the externally-attached PTC element according to the modification.
Figure 7C:
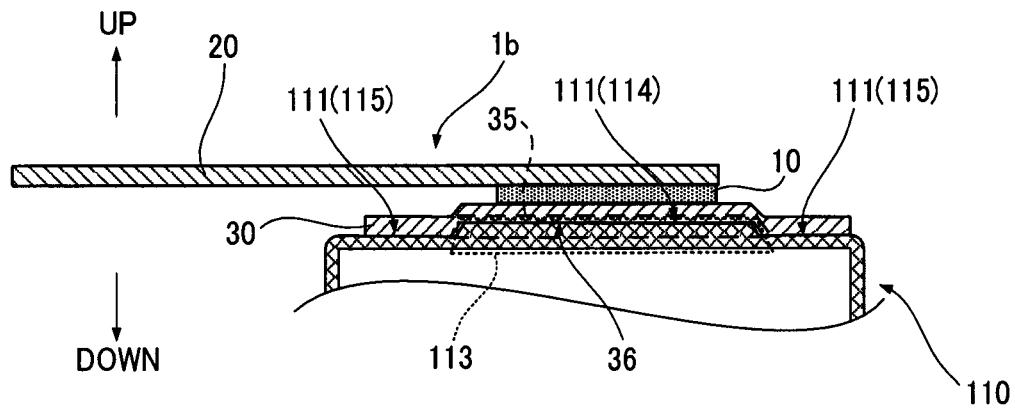
FIG. 7C is a drawing illustrating the externally-attached PTC element according to the modification.

FIG. 7A, FIG. 7B, and FIG. 7C illustrate the external PTC element 1b according to this modification. FIG. 7A is a plan view viewing the external PTC element 1b according to the modification from upward. FIG. 7B is a cross-sectional view taken along an arrow b-b in FIG. 7A. FIG. 7C is a cross-sectional view of the electrode terminal 111 with the circular convex portion 113 in the cylindrical battery 110, to which this external PTC element 1b is attached.

As illustrated in FIG. 7A, the externally-attached PTC element 1b has the planar shape similar to the externally-attached PTC element 1a according to the above-mentioned embodiment when viewed from upward. Meanwhile, as illustrated in FIG. 7B, a concave portion 35 which is circularly opened to a lower surface 33 side of the bottom plate 30 is formed. As illustrated in FIG. 7C, when this external PTC element 1b is attached to the electrode terminal 111, the circular convex portion 113 of the electrode terminal 111 is inserted into this concave portion 35. Thus, a top end surface 114 of the circular convex portion 113 abuts on a bottom 36 of the concave portion 35.

Figure 8:
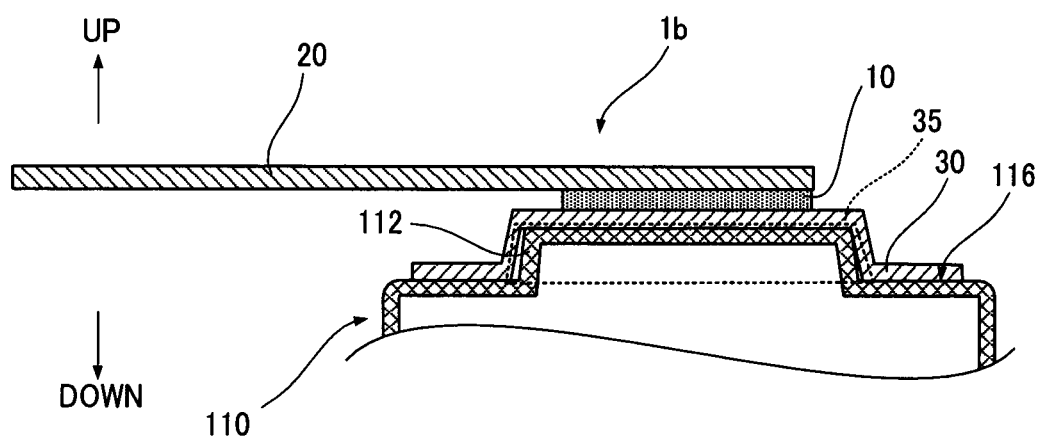
FIG. 8 is a drawing illustrating an application form of the externally-attached PTC element according to the modification.

An outer-circumference-side top surface 115 of the electrode terminal 111 contacts the lower surface 33 of the bottom plate 30 on the outer circumference side. As illustrated in FIG. 8, the externally-attached PTC element 1b according to this modification having the deeper concave portion 35 is also applicable to the end surface 116 having the higher convex terminal 112 like the positive electrode terminal.

Other Embodiments

Through welding of the bottom plate 30 to the electrode terminal 111, which is on the one end surface of the cylindrical battery 110, the externally-attached PTC element 1a according to the embodiment and the externally-attached PTC element 1b according to the modification are attached to the cylindrical battery 110. To achieve this, the bottom plate 30 has the circular plate shape wider than the top panel 20 with the distal end side 21 that also functions as the lead terminal. Then, the outer circumferential portion of the bottom plate 30 in contact with the electrode terminal 111 of the cylindrical battery 110 is spot-welded. Surely, the welding features a large attaching strength and a drop due to a vibration or a similar impact is less likely to occur. Meanwhile, the welding requires a dedicated welding machine. For example, in the case where an external PTC element is attached to a battery incorporated into an electronic circuit at a trial manufacture phase, it is not necessary to use the external PTC element assuming the welding. Thus, there may be the case where a further general-purpose external PTC element is required.

Figure 9A:
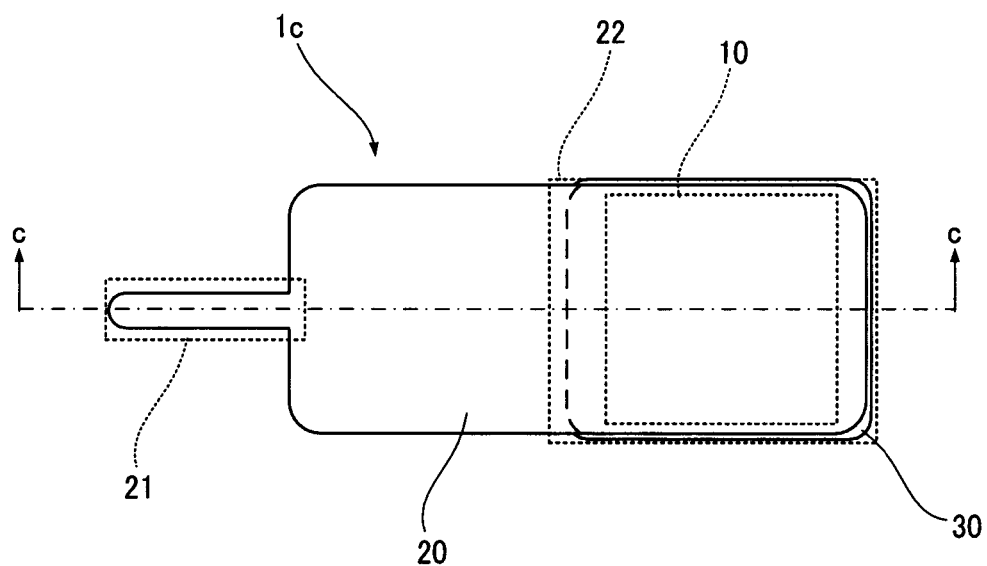
FIG. 9A is a drawing illustrating an externally-attached PTC element according to another embodiment of the present invention.
Figure 9B:
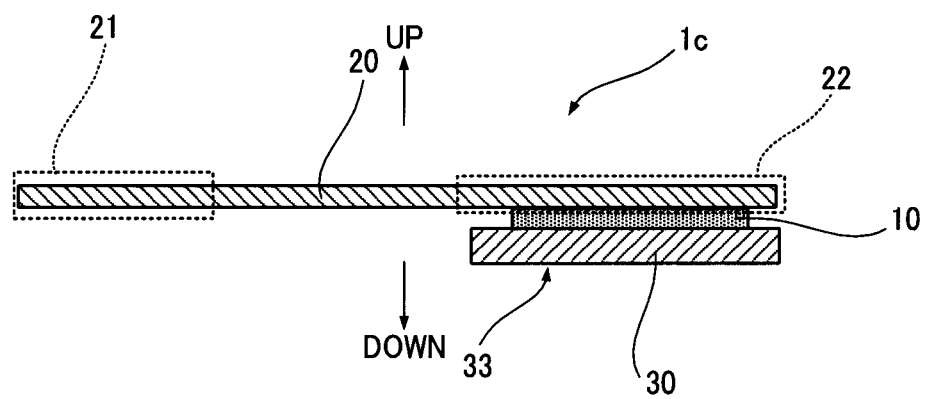
FIG. 9B is a drawing illustrating the externally-attached PTC element according to the other embodiment of the present invention.

FIG. 9A and FIG. 9B illustrate a general-purpose external PTC element 1c. FIG. 9A is a plan view of the general-purpose external PTC element 1c. FIG. 9B is a cross-sectional view taken along an arrow c-c in FIG. 9A. In the external PTC element 1c illustrated in FIG. 9A and FIG. 9B, the bottom plate 30 with a width equivalent to the top panel 20 is opposed to the base end side 22 of the top panel 20 with the distal end side 21 that also functions as the lead terminal. The PTC element 10 is disposed in the opposed area. It is only necessary to attach the lower surface 33 of the bottom plate 30 to the electrode terminal 111 using, a conductive adhesive, a solder, or the like.

Thus, the external PTC element 1c illustrated in FIG. 9A and FIG. 9B can eliminate the need for welding; therefore, the external PTC element 1c is attachable not limited to the electrode terminal 111 but also to the convex terminal 112.

The battery to which the external PTC elements 1a, 1b, and 1c according to the embodiments of the present invention are attached is not limited to the cylindrical battery 110. It is only necessary that the battery is a tubular battery whose both end surfaces serve as electrode terminals.

REFERENCE SIGNS LIST

1a, 1b, 1c, 101, 102 externally-attached PTC element
10 PTC element (PTC chip)
20 top panel (metal plate)
21 distal end side
22 base end side
30 bottom plate (metal plate)
33 lower surface
34 welding position
35 concave portion
36 bottom
40 solder
50 lead wire
60 lead terminal plate
61 distal end side
110 cylindrical battery
111 electrode terminal
112 electrode terminal (convex terminal)
113 circular convex portion (base-shaped convex portion)
114 top end surface
115 outer-circumference-side top surface
116 end surface
120 metal plate
130 metal plate
160 terminal plate
201 PTC element
220 metal plate (electrode plate)
221 distal end side
222 base end side
230 metal plate (electrode plate)
231 distal end side
232 base end side

The invention claimed is:
1. A tubular battery, an externally-attached positive temperature coefficient (PTC) element attached to the tubular battery, and a lead terminal plate, wherein: the tubular battery comprises:
a first electrode terminal, and
a second electrode terminal; and
the externally-attached PTC element includes:
a bottom plate made of a metal plate, the bottom plate being attached to the first electrode terminal of the tubular battery;
a plate-shaped PTC element, and
a top panel made of a metal plate,
the plate-shaped PTC element and the top panel being stacked in that order above the bottom plate disposed below, the plate-shaped PTC element being disposed in an opposed area between the top panel and the bottom plate, the top panel extending in a first direction with respect to a planar area of the bottom plate, the top panel having a distal end formed into a single lead pin mountable to a circuit board;

wherein the lead terminal plate is attached to the second electrode terminal of the tubular battery and is made of a metal plate extending linearly in the first direction, the lead terminal plate having a distal end formed into two lead pins inserted into respective through-holes on the circuit board, whereby the tubular battery cannot be mounted in an erroneous direction.

2. The tubular battery, the externally-attached PTC element attached to the tubular battery, and the lead terminal plate according to claim 1, wherein the bottom plate of the externally-attached PTC element has a lower surface with a shape along a planar shape of the first electrode terminal of the tubular battery, and an area on a top surface of the bottom plate that is exposed as an area to be welded to the first electrode terminal.

3. The tubular battery, the externally-attached PTC element attached to the tubular battery, and the lead terminal plate according to claim 2, wherein:

the tubular battery has a cylindrical shape, the tubular battery includes a base-shaped convex portion on the first electrode terminal, the base-shaped convex portion being formed concentrically with an outer circumferential circle of the first electrode terminal, and the bottom plate of the externally-attached PTC element includes a concave portion on the lower surface, the base-shaped convex portion of the first electrode terminal of the tubular battery being inserted into the concave portion of the bottom plate.

* * * * *